US011912176B2

(12) United States Patent
Zhao

(10) Patent No.: US 11,912,176 B2
(45) Date of Patent: Feb. 27, 2024

(54) CHILD SAFETY SEAT AND SIDE WING ASSEMBLY THEREOF

(71) Applicant: WONDERLAND SWITZERLAND AG, Steinhausen (CH)

(72) Inventor: Guanghui Zhao, Steinhausen (CH)

(73) Assignee: WONDERLAND SWITZERLAND AG, Steinhausen (CH)

( * ) Notice: Subject to any disclaimer, the term of this patent is extended or adjusted under 35 U.S.C. 154(b) by 3 days.

(21) Appl. No.: 17/587,294

(22) Filed: Jan. 28, 2022

(65) Prior Publication Data

US 2022/0242282 A1    Aug. 4, 2022

(30) Foreign Application Priority Data

Jan. 29, 2021  (CN) .......................... 202110128469.3

(51) Int. Cl.
*B60N 2/28*    (2006.01)
(52) U.S. Cl.
CPC ......... *B60N 2/2872* (2013.01); *B60N 2/2806* (2013.01); *B60N 2/2851* (2013.01)
(58) Field of Classification Search
CPC ............... B60N 2/2872; B60N 2/2806; B60N 2002/2815; B60N 2/2816; B60N 2/2884
See application file for complete search history.

(56) References Cited

U.S. PATENT DOCUMENTS

| 5,957,531 A * | 9/1999 | Kane .................... | B60N 2/2806 |
| | | | 297/250.1 |
| 6,193,310 B1 * | 2/2001 | Batalaris .............. | B60N 2/2893 |
| | | | 297/253 |
| 6,412,866 B2 * | 7/2002 | Koyanagi ............ | B60N 2/2839 |
| | | | 297/250.1 |
| 6,746,080 B2 * | 6/2004 | Tsugimatsu .......... | B60N 2/2869 |
| | | | 297/256.16 |
| 2008/0211278 A1 * | 9/2008 | Macliver .............. | B60N 2/2812 |
| | | | 297/464 |

FOREIGN PATENT DOCUMENTS

| CN | 101048092 A | 10/2007 |
| CN | 201833905 U | 5/2011 |
| CN | 103507677 A | 1/2014 |
| CN | 103661024 A | 3/2014 |
| CN | 204161164 U | 2/2015 |
| CN | 109649228 A | 4/2019 |
| CN | 210733909 U | 6/2020 |
| EP | 1818209 B1 | 8/2007 |
| GB | 2582533 B | 4/2021 |
| TW | I579165 B | 4/2017 |

OTHER PUBLICATIONS

Taiwanese Office Action issued in corresponding Taiwanese Application No. 111103990, dated Nov. 10, 2022, pp. 1-17.
German Office Action issued in corresponding German Application No. 10 2022 101 988.8, dated Apr. 11, 2023, pp. 1-8.

* cited by examiner

*Primary Examiner* — David R Dunn
*Assistant Examiner* — Tania Abraham
(74) *Attorney, Agent, or Firm* — HAUPTMAN HAM, LLP

(57) ABSTRACT

The disclosure provides a child safety seat having a side wing assembly. The side wing assembly includes a ring for a seat belt of a vehicle to pass through. A strengthening member is assembled to the ring to improve the strength of the ring to prevent the ring from being deformed or damaged under impact.

11 Claims, 5 Drawing Sheets

CHILD SAFETY SEAT AND SIDE WING ASSEMBLY THEREOF

CROSS REFERENCE TO RELATED APPLICATIONS

This application claims the priority of Chinese Patent Application No. 202110128469.3 filed Jan. 29, 2021, the content of which is hereby incorporated by reference in its entirety.

TECHNICAL FILED

The present disclosure relates to a child safety seat and a side wing assembly for the child safety seat.

BACKGROUND

Child safety seats are used in vehicles to improve the safety of children in vehicles. In the event of, for example, a collision or sudden deceleration, the child safety seat reduces the impact on the children and restricts the children's body movement, so as to reduce the injury to the children and ensure their safety in vehicles. A seat belt of the vehicle is typically required to fasten the child safety seat to the vehicle, e.g. to the seats of the vehicle.

SUMMARY

One aspect of the present disclosure provides a side wing assembly for a child safety seat. The side wing assembly includes a side wing having a ring for a seat belt of a vehicle to pass through and a strengthening member assembled to the ring.

In an embodiment, the strengthening member is made of at least one of metal, plastic, carbon fiber or ceramic, and a strength of the strengthening member is greater than that of the side wing.

Further, the strengthening member is configured such that the strength is able to withstand an external force of 1000N to 5000N.

In an embodiment, the strengthening member is buried inside the ring.

In an embodiment, the strengthening member has a flat structure that fits onto an inner side of the ring.

In an embodiment, the ring has an inside slot with an opening and the strengthening member is inserted into the slot through the opening.

In an embodiment, the strengthening member has a semi-closed or closed structure.

In an embodiment, the strengthening member has a securing hole through which a material of the side wing extends.

In an embodiment, the material comprises gel that flows into the securing hole during injection molding of the side wing.

In an embodiment, wherein the strengthening member is fixed to the ring by at least one of snap-in connection, welding, or screw connection.

In an embodiment, a part of the ring is connected to a plate of the side wing and another part is suspended outside the plate of the side wing.

Another aspect of the present disclosure provides a child safety seat including a side wing assembly as described in the above embodiments.

According to the child safety seat and the side wing assembly of the present disclosure, the ring of the side wing is provided with a strengthening member that is able to resist large external impacts, thus preventing the ring of the side wing from being deformed or damaged.

The details of one or more embodiments of the present disclosure are set forth in the following drawings and description. Other features, objects and advantages of the present disclosure will become apparent from the description, drawings and claims.

BRIEF DESCRIPTION OF THE DRAWINGS

To illustrate the technical solutions of the embodiments of the present disclosure, the accompanying drawings for describing the embodiments are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION

Figure 1:
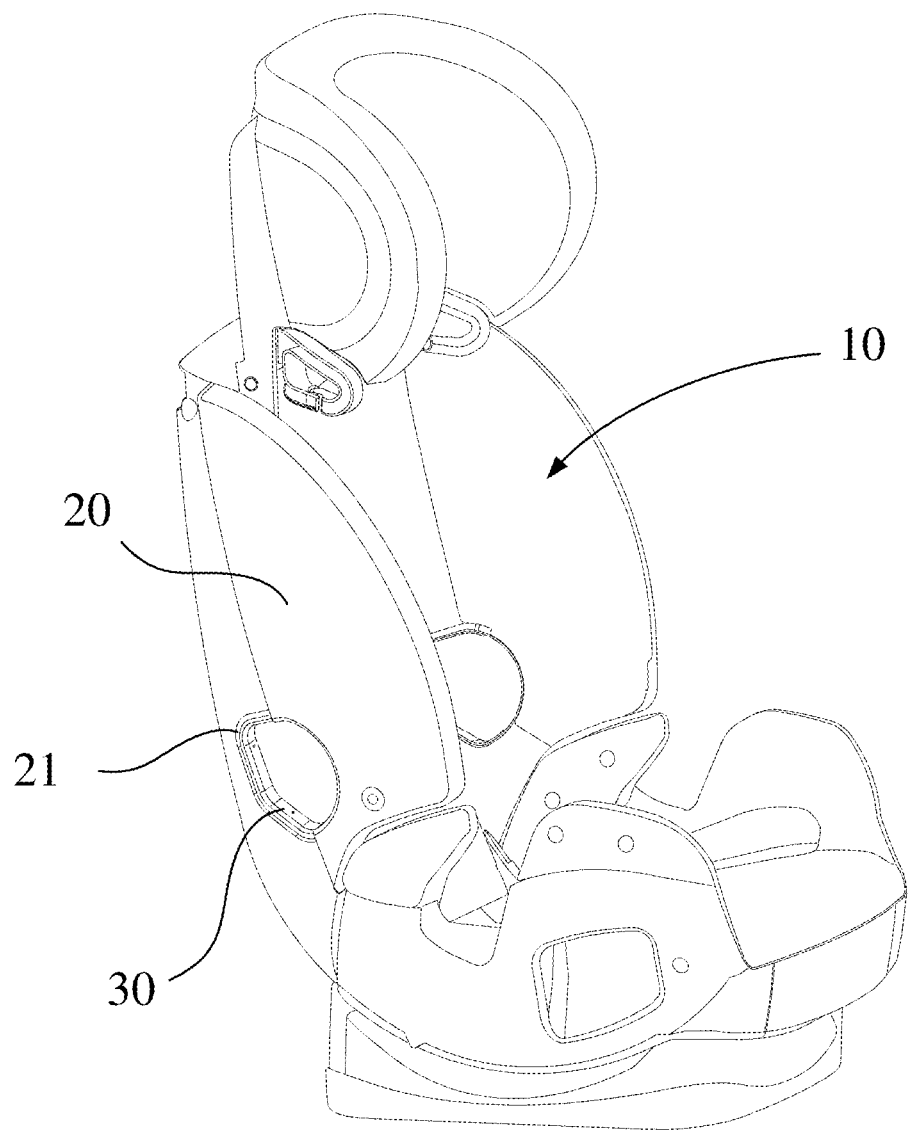
FIG. 1 is a perspective view of a child safety seat of an embodiment of the present disclosure.

Implementation of the present disclosure are elaborated below with reference to the accompanying drawings, to enable the objectives, advantages and features of the present disclosure more comprehensible. Specific details are described below to enable persons skilled in the art to fully understand the present disclosure. However, the present disclosure may be implemented in other manners besides those described herein. Persons skilled in the art can make such improvements without departing from the concept of the present disclosure. Therefore, the present disclosure is not limited by the embodiments disclosed in the following.

In the description of the present disclosure, it should be understood that terms such as "center", "longitudinal", "transverse", "length", "width", "thickness", "front", "up", "down", "front", "back", "left", "right", "vertical", "horizontal", "top", "bottom", "inside", "clockwise", "counterclockwise", "axial", "radial", "circumferential" and the like indicate orientation or positional relationships based on the orientation or positional relationships shown in the accompanying drawings, and are intended only to facilitate and simplify the description of the disclosure, not to indicate or imply that the devices or elements must have a particular orientation, be constructed and operate in a particular orientation, and therefore are not to be construed as a limitation of the present disclosure.

In the present disclosure, unless otherwise expressly specified and defined, terms such as "mount", "connect", "interconnect", "secure", "dispose" and other terms shall be understood in a broad way. For example, unless otherwise expressly defined, "connection" may be a fixed connection, detachable connection, or integral connection; it may be a mechanical connection, an electrical connection; it may be direct connection, or indirect connection through an intermedium; and it may be an internal connection of two components or an interaction between two components. For example, when an element is described as "fixed" or "disposed" to another element, it may be directly on the other element or there may be an intermedium element. For those of ordinary skill in the art, the specific meaning of the above terms in the context of the present disclosure can be understood on a case-by-case basis.

In the present disclosure, unless otherwise expressly specified and defined, if a first member is described to be on or under a second member, there may be direct contact between the first and second members, or indirect contact between the first and second members through an intermedium. Besides, if a first member is described to be above a second member, it may mean that the first member is rightly above or diagonally above the second member, or that the first member is horizontally higher above the second member. If a first member is described to be below a second member, it may mean that the first member is right below or diagonally below the second member, or that the first member is horizontally lower than the second member.

It should be noted that when an element is described to be "fixed to" or "provided on" another element, it may be directly on the other element or there may be an intermedium element as well. When an element is described to be "attached to" another element, it may be directly attached to the other element or there may be an intermedium element. The terms "vertical", "horizontal", "up", "down", "left", "right" and similar expressions used herein are for illustrative purposes only and are not meant to be the sole means of implementation.

According to a safety seat known to the applicant, a seat belt of a vehicle passes through the safety seat, and in the event of a collision, emergency braking or other situations, the safety seat is hit and thus the part of the safety seat in contact with the seat belt is pressed. If the collision is severe, it may lead to the deformation or even fracture of the part of the safety seat.

Figure 2:
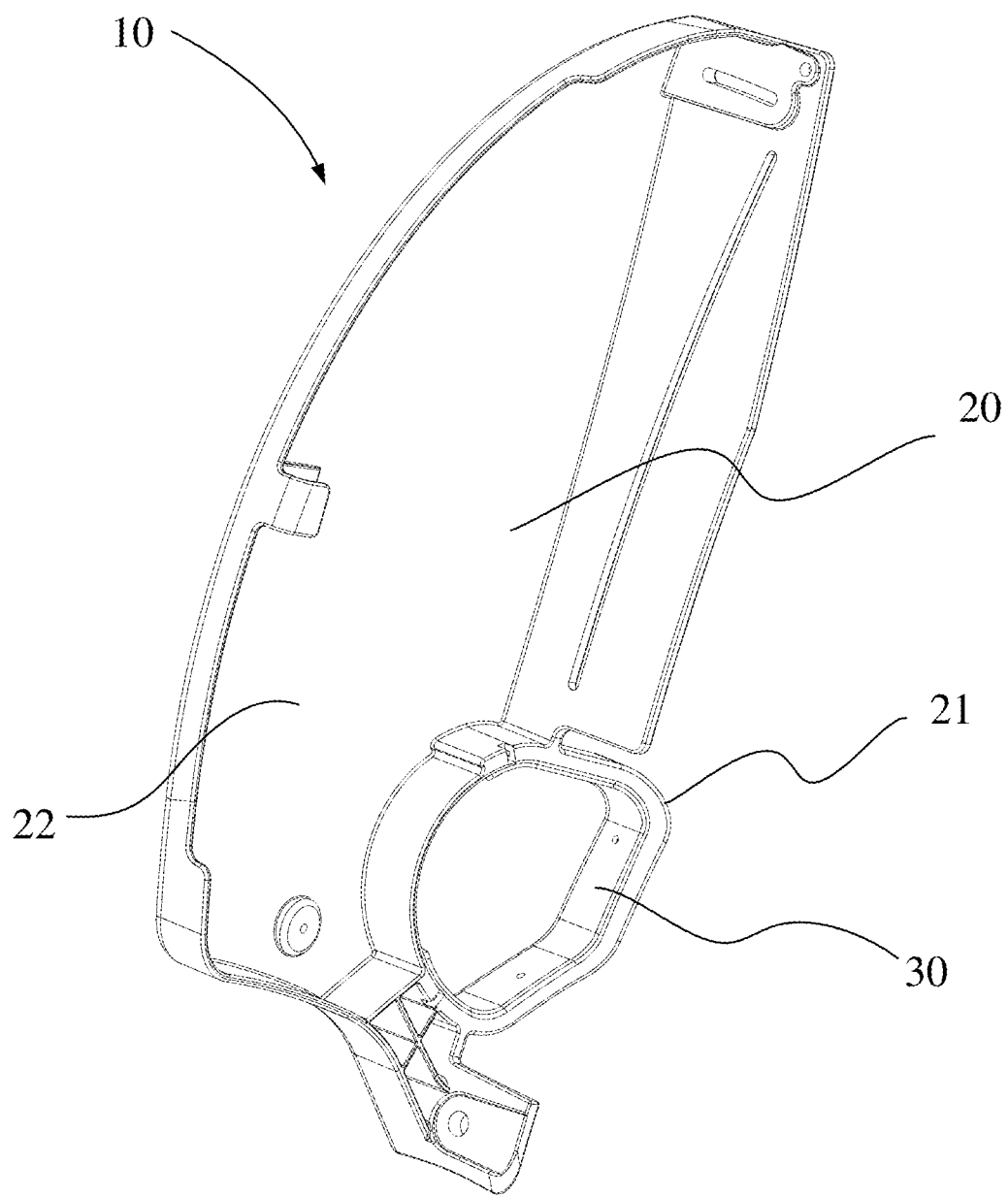
FIG. 2 is a perspective assembly view of a side wing assembly of an embodiment of the present disclosure.

Therefore, one aspect of the present disclosure provides a child safety seat, which overcomes the defects of the aforementioned existing safety seat. According to some embodiments of the disclosure, as shown in FIGS. 1-2, the child safety seat includes a side wing assembly 10 that includes a side wing 20. The side wing 20 has a ring 21 for a seat belt of a vehicle to pass through so that the safety seat is securely positioned on the seat of the vehicle. A strengthening member 30 is assembled to the ring 21 to improve the strength of the ring 21 and prevent the ring 21 from deformation or damage under impact.

In some embodiments, the side wing assembly 10 and other components jointly form a side support of the child safety seat to provide support and protection for children. In other embodiments, the side wing assembly 10 may independently form the side support of the child safety seat. The side wings 20 may be made of plastic, and other materials can also be used as needed.

Figure 3:
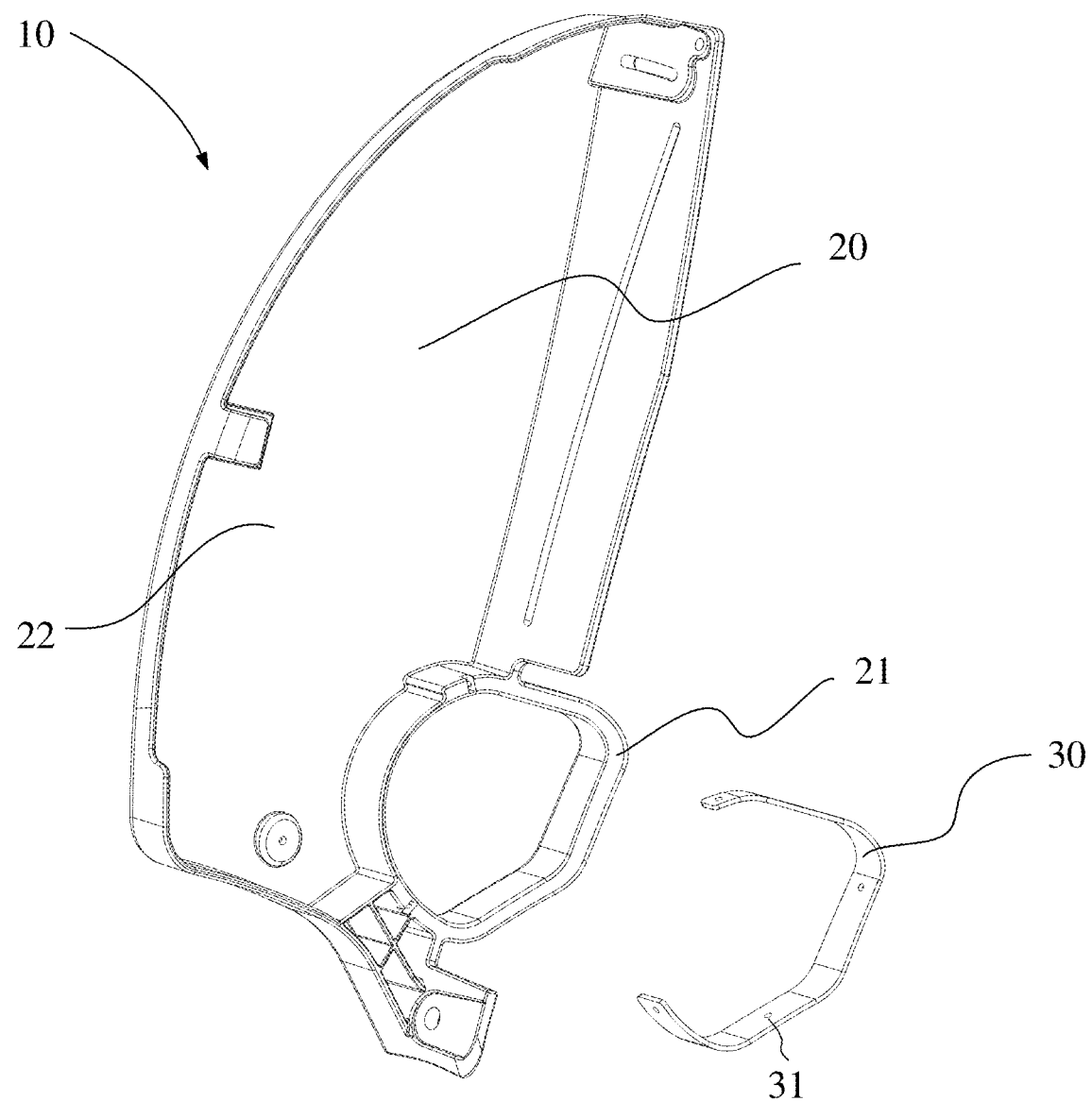
FIG. 3 is an exploded, perspective view of the side wing assembly shown in FIG. 2.

In some embodiments, the ring 21 has a closed structure as shown in FIGS. 2-3. A part of ring 21 extends approximately vertically from a plate 22 of side wing 20, allowing better contact with the seat belt of a vehicle, while another part of ring 21 is suspended outside the plate 22.

Figure 6:
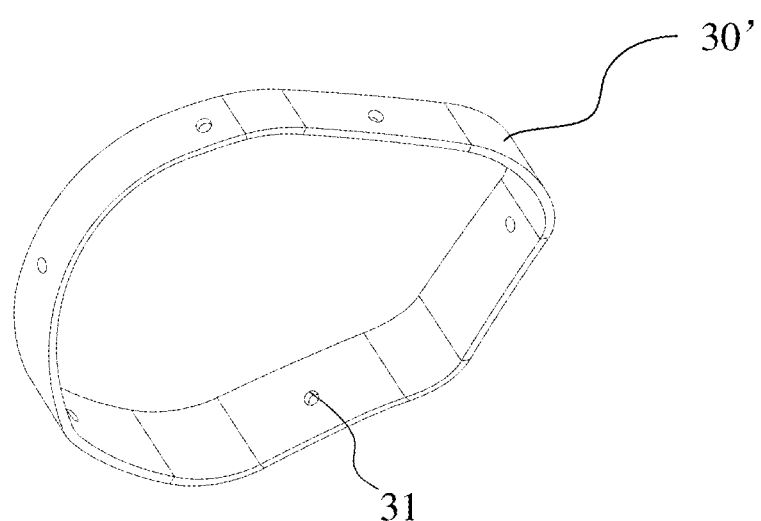
FIG. 6 is a perspective view of a strengthening member of another embodiment of the present disclosure.

The strengthening member 30 is assembled to the ring 21 and has a shape that matches an overall shape of the ring 21 or matches a shape of part of the ring 21. In an embodiment, as shown in FIGS. 2-5, the strengthening member 30 has a semi-closed structure, such as a C-shape, and covers the entire part of the ring 21 that is suspended outside the plate 22. In other embodiments, as shown in FIG. 6, a strengthening member 30' has a closed structure covering the entire circumference of the ring 21.

The strengthening member 30 may be made of one of plastic, carbon fiber, metal, or ceramic, or has a composite structure composed of two or more materials. In an embodiment, the strengthening member 30 is made of a metal whose strength is greater than the strength of the side wings 20. Depending on specific needs, the strengthening member 30 is configured to have a strength able to withstand an external force of 1000N to 5000N. Depending on material properties and structural form, the strengthening member 30 may be manufactured by, for example, injection molding, stamping, forging, additive manufacturing, etc. In addition, the strengthening member 30 may be assembled to the ring 21 by a variety of means, including snap-in connection, welding, screw connection, etc., or a combination of these means. In an embodiment, the strengthening member 30 is assembled to the ring 21 during the formation of the side flange 20. Specifically, the strengthening member 30 is provided with a securing hole 31, and during injection molding of the side wing plate 20, gel flows into the securing hole 31 and then cures, thus fixing the strengthening member 30 by snap effect. Obviously, it is also possible to assemble the strengthening member 30 after the side wing 20 is molded, in which case the molded side wing 20 is provided with a projection (not shown) that snaps into the securing hole 31. In other embodiments, depending on the material of the side wing 20, the securing holes 31 may be available for other types of material of the side wing 20 to extend into and thereby achieve the fixing of the strengthening member 30 to the ring 21.

According to the embodiment of FIGS. 2-3, the strengthening member 30 is positioned on the inner side of the ring 21 and is able to be in direct contact with the seat belt of a vehicle. For example, the strengthening member 30 has a flat structure that fits onto the inner side of the ring 21. In other embodiments, the strengthening member 30 can be positioned on the outside of the ring 21, which can also improve the strength of the ring 21.

Figure 4:
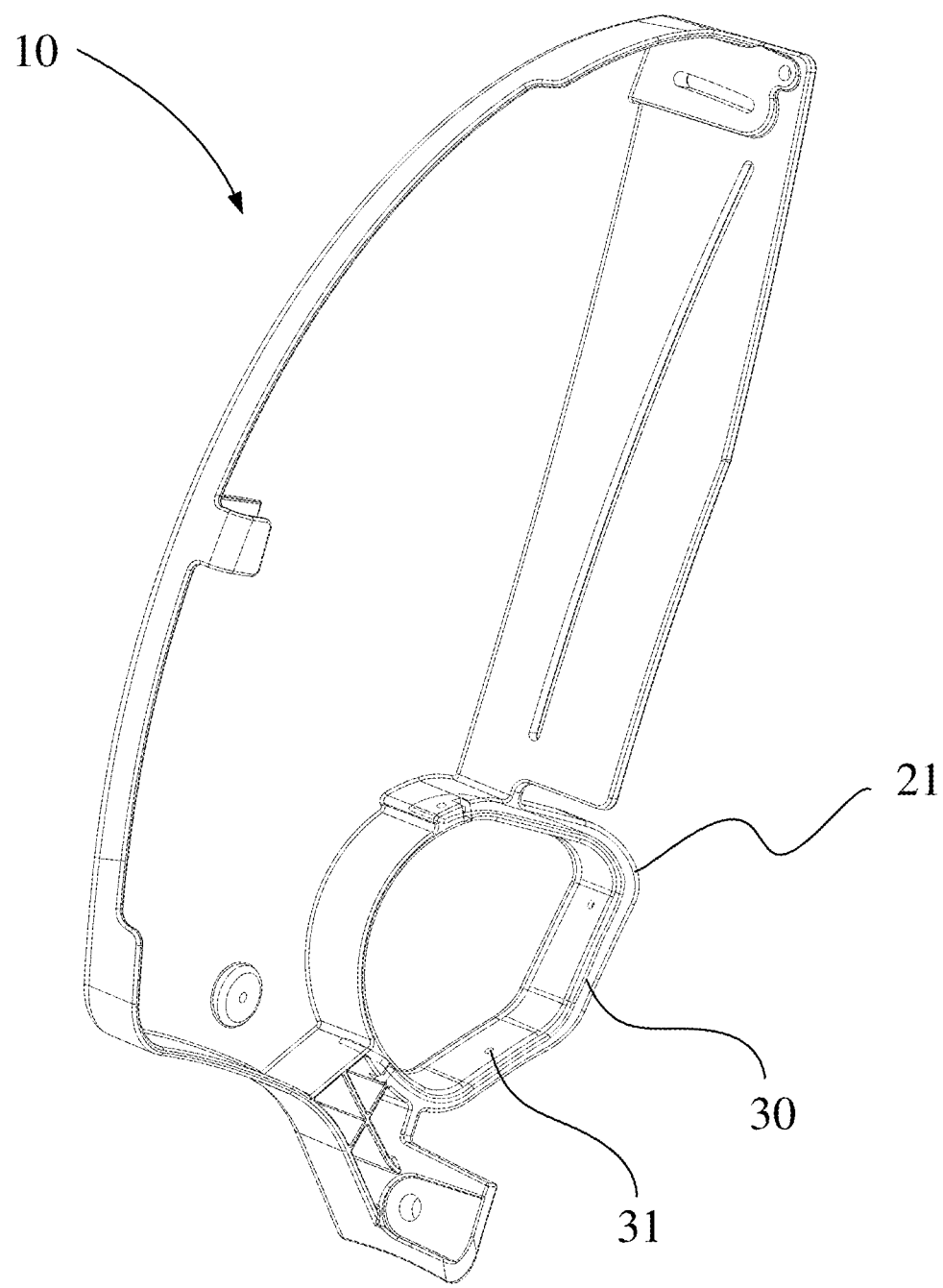
FIG. 4 is an assembled, perspective view of a side wing assembly of another embodiment of the present disclosure.
Figure 5:
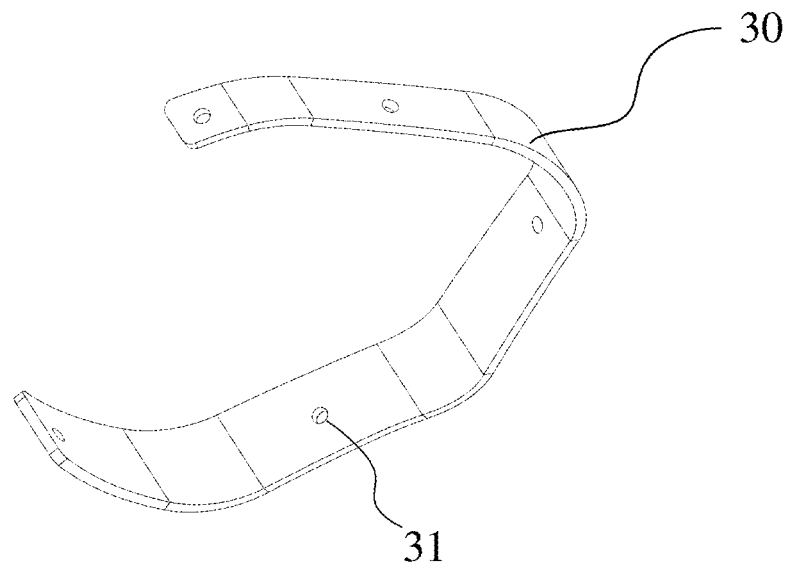
FIG. 5 is a perspective view of a strengthening member of an embodiment of the present disclosure.

FIG. 4 is an assembled perspective view of the side wing assembly 10 of another embodiment of the present disclosure, with difference from the embodiment shown in FIGS. 2-3 in that the strengthening member 30 (shown with a dash line in FIG. 4) is buried inside the ring 21. For example, it is possible to assemble the strengthening member 30 to the ring 21 by disposing the strengthening member 30 inside the ring 21 during the injection molding process of the ring 21. During the injection molding process of the ring 21, gel flows into the securing hole 31 and cures so as to further enhance the fixing between the ring 21 and the strengthening member 30. It can be understood that the term "buried" as described in this embodiment includes the cases where the fixed member 30 is fully buried in the ring 21, or partially buried in the ring 21, i.e., the fixed member 30 is partially exposed.

In a modification of the embodiment, the ring 21 may also be provided with an inside slot (not shown) having an opening through which the strengthening member 30 is inserted into the slot to be assembled to the ring 21, thus achieving the strengthening of the ring 21.

In the above embodiments, the strengthening member 30 has a flat structure. In other embodiments, the fixing members 30 may be of other structures, such as thin metal rods. In addition, the number of the strengthening member 30 is not limited to one, rather, multiple fixing members 30 may be provided and arranged side by side. Further, the strengthening member 30 may be of a more complex structure, such as a grid structure. All of these ways of fixing members 31 can achieve the strengthening of the ring 21.

According to the child safety seat of embodiments of the present disclosure, there is provided a strengthening member assembled to the ring for the seat belt to pass through, so it can resist an impact caused by large external forces and prevent the ring from deformation or damage.

According to another aspect of the present disclosure, there is also provided a side wing assembly which includes a side wing 20 and a strengthening member 30 assembled to the side wing 20, as described in the various embodiments above.

The technical features of the above described embodiments can be combined in any way according to the actual situations. For simplification purpose, not all possible combinations of the technical features in the above described embodiments are described. however, as long as there is no contradiction in the combination of these technical features, they should be considered to fall with the scope of the present disclosure.

Only several embodiments of the present disclosure are described with more specific and detailed descriptions, but they are not intended to be a limitation of the scope of the patent invention. It should be noted that for a person of ordinary skill in the art, a number of modifications and improvements can be made without departing from the conception of the present invention, which all belong to the patent scope of the present invention. Therefore, the patent scope of the present invention shall be subject to the attached claims.

What is claimed is:

1. A side wing assembly for a child safety seat, comprising:
    a side wing having a ring for a seat belt of a vehicle to pass through; and
    a strengthening member assembled to the ring,
    wherein a part of the ring is connected to a plate of the side wing and another part is suspended outside the plate of the side wing.

2. The side wing assembly of claim 1, wherein the strengthening member is made of at least one of metal, plastic, carbon fiber or ceramic, and a strength of the strengthening member is greater than that of the side wing.

3. The side wing assembly of claim 1, wherein the strengthening member is configured such that a strength is able to withstand an external force of 1000N to 5000N.

4. The side wing assembly of claim 1, wherein the strengthening member is buried inside the ring.

5. The side wing assembly of claim 1, wherein the strengthening member has a flat structure that fits onto an inner side of the ring.

6. The side wing assembly of claim 1, wherein the strengthening member has a semi-closed or closed structure.

7. The side wing assembly of claim 1, wherein the strengthening member is fixed to the ring by at least one of snap-in connection, welding, or screw connection.

8. A child safety seat, comprising the side wing assembly of claim 1.

9. A side wing assembly for a child safety seat, comprising:
    a side wing having a ring for a seat belt of a vehicle to pass through; and
    a strengthening member assembled to the ring,
    wherein the ring has an inside slot with an opening and the strengthening member is inserted into the inside slot through the opening.

10. A side wing assembly for a child safety seat, comprising:
    a side wing having a ring for a seat belt of a vehicle to pass through; and
    a strengthening member assembled to the ring,
    wherein the strengthening member has a securing hole through which a material of the side wing extends.

11. The side wing assembly of claim 10, wherein the material comprises a gel that flows into the securing hole during injection molding of the side wing.

* * * * *